United States Patent [19]

Müller

[11] 4,065,448

[45] Dec. 27, 1977

[54] TERTIARY ALKYL SUBSTITUTED DISAZO PIGMENTS

[75] Inventor: Willy Müller, Riehen, Switzerland

[73] Assignee: Ciba-Geigy AG, Basel, Switzerland

[21] Appl. No.: 639,561

[22] Filed: Dec. 10, 1975

Related U.S. Application Data

[63] Continuation-in-part of Ser. No. 526,021, Nov. 21, 1974, abandoned, which is a continuation-in-part of Ser. No. 365,664, May 31, 1973, abandoned, which is a continuation of Ser. No. 109,955, Jan. 26, 1971, abandoned.

[30] Foreign Application Priority Data

Feb. 3, 1970 Switzerland .................. 1522/70

[51] Int. Cl.$^2$ ............................................. C09B 43/12
[52] U.S. Cl. ........................ 260/176; 106/288 Q; 260/571
[58] Field of Search .................................. 260/176

[56] References Cited

U.S. PATENT DOCUMENTS 3,413,279  11/1968  Mueller ............................. 260/176

*Primary Examiner*—Charles F. Warren

[57] ABSTRACT

Disazo pigments of the formula

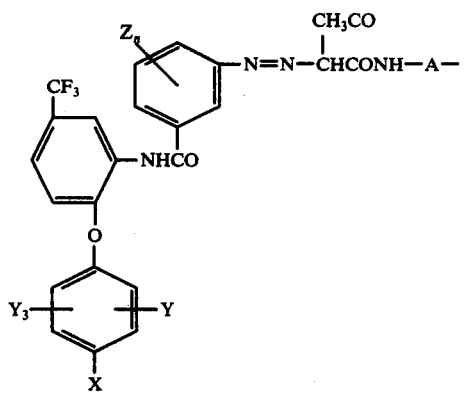

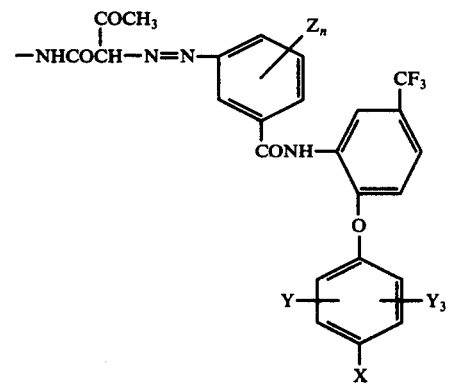

in which A denotes a radical of the formulae

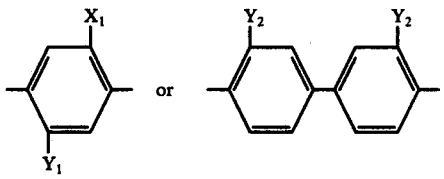

wherein $X_1$, $Y_1$ and $Y_2$ each denote hydrogen or chlorine, lower alkyl or lower alkoxy, X stands for branched alkyl having 3 to 9 carbon atoms, Y denotes hydrogen, halogen or lower alkyl, $Y_3$ denotes hydrogen or lower alkyl, Z is hydrogen, halogen, lower alkyl, lower alkoxy or lower carbalkoxy and n or 2 are useful for coloring plastics and lacquers in yellow shades having excellent fastness properties, especially fastness to weathering.

4 Claims, No Drawings

TERTIARY ALKYL SUBSTITUTED DISAZO PIGMENTS

This is a continuation-in-part of our copending application Ser. No. 526,021 filed Nov. 21, 1974, now abandoned, which in turn is a continuation-in-part of our copending application Ser. No. 365,664 filed May 31, 1973 now abandon, which in turn is a continuation of our copending application Ser. No. 109,955 filed Jan. 26, 1971 now abandoned.

It is known that in the automobile lacquer industry pigments of excellent fastness properties, for example high fastness to light, overlacquering and especially to weathering are required. Especially in the field of yellow pigments, products which fulfill these fastness requirement are very rare. French Pat. No. 1,465,252 describes pigment having excellent fastness to light and overlaquering but they are not fast to weathering especially in metallic pigmented lacquers and therefore unsuitable for automobile lacquers.

It is an object of the present invention to provide yellow pigments having outstanding fastness to weathering. These pigments have the formula

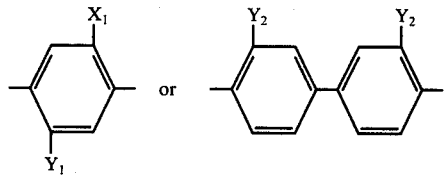

wherein $X_1$, $Y_1$ and $Y_2$ each denotes hydrogen or chlorine, lower alkyl or lower alkoxy, X stands for branched alkyl having 3 to 9 carbon atoms, Y denotes hydrogen, halogen or lower alkyl, $Y_3$ denotes hydrogen or lower alkyl, Z is hydrogen, halogen, lower alkyl, lower alkoxy or lower carbalkoxy and $n$ is 1 or 2.

Of special interest are compounds of the formula 1) wherein X denotes a radical of the formula

in which $R_3$ is alkyl containing 2 to 6 carbon atoms.

The new pigments are obtained by condensing a dicarboxylic acid dichloride of the formula

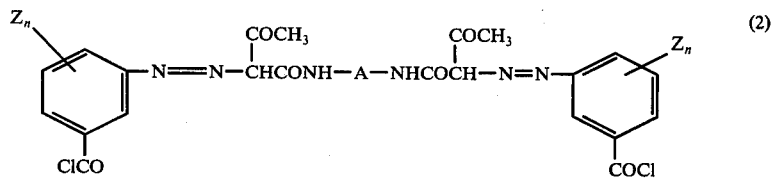

with an amine of the formula

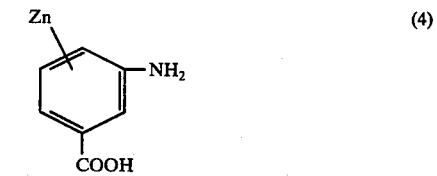

in a molar ratio of 1:2.

The dicarboxylic acids chlorides of the formula (2) can advantageously be obtained by coupling a diazo compound of a monocarboxylic acid of the formula

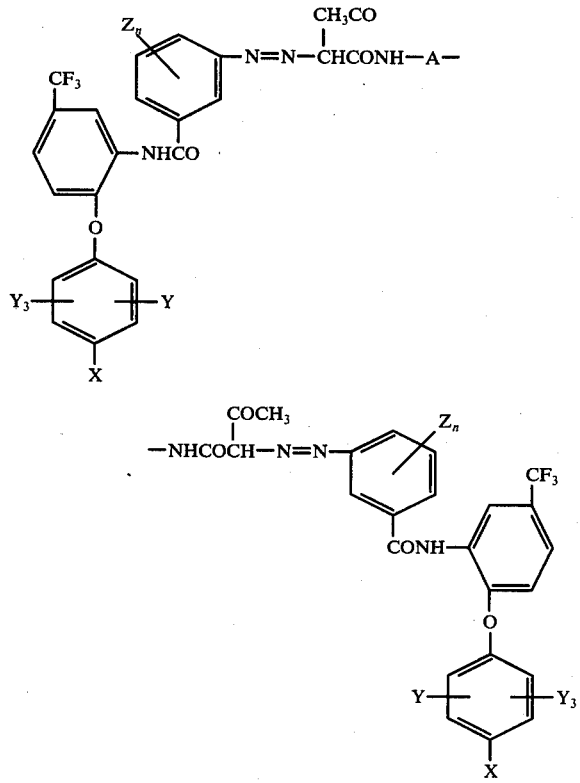

in which A denotes a radical of the formulae wherein Z preferably denotes hydrogen, halogen or lower alkyl with the appropriate diacetoacetyl-arylenediamine in a molar ratio of 2:1.

The diacetoacetyl-arylenediamines can be obtained in a simple manner by the action of diketene or acetoacetic aster on an aromatic diamine, for example, 1,4-diaminobenzene, 1,3-diaminobenzene, 1,3-diamino-4-methylbenzene, 1,3-diamino-2-methylbenzene, 1,3-diamino-4-methoxybenzene, 1,3-diamino-4-chlorobenzene, 1,3-diamino-2,5-dichlorobenzene, 1,4-diamino-2-chlorobenzene, 1,4-diamino-2-bromobenzene, 1,4-diamino-2-cyanobenzene, 1,4-diamino-2,5-dichlorobenzene, 1,4-diamino-2-methylbenzene, 1,4-diamino-2-trifluoromethylbenzene, 1,4-diamino-2,5-dimethylbenzene, 1,4-diamino-2-methoxybenzene, 1,4-diamino-2-methoxy-5-chlorobenzene, 1,4-diamino-2,5-dimethoxybenzene, 1,4-diamino-2-methoxy-5-methylbenzene, 1,4-diamino-2,5-diethoxybenzene, 1,3-diamino-4,6-dimethylbenzene, 1,3-diamino-2,6-dimethylbenzene, 4,4'-diaminodiphenyl, 3,3'-dichloro-4,4'-diaminodiphenyl, 3,3'-dimethyl-4,4'-diaminodiphenyl, 3,3'-dimethoxy-4,4'-diaminodiphenyl, 3,3'-dimethoxy-4,4'-diamino-6,6'-dichlorodiphenyl, 3,3',5,5'-tetrachloro-4,4'-diaminodiphenyl, 3,3'-dichloro-5,5'-dimethyl-4,4'-diaminodiphenyl, 2,8-diaminochrysene, 4,11-diaminofluoroanthene, 2,6-or 1,5-diaminonaphthalenes, 2,8-diamino-diphenylene oxide, 3,7-diamino-diphenylenesulphone and 2,8-diamino-carbazole.

As examples of aminocarboxylic acids of the formula (4) may be mentioned 3-aminobenzoic acid, 4-aminobenzoic acid, 3-chloro-4-aminobenzoic acid, 4-chloro-3-aminobenzoic acid, 4-bromo-3-aminobenzoic acid, 4-fluoro-3-aminobenzoic acid, 2,4-dichloro-5-aminobenzoic acid, 3-methyl-4-aminobenzoic acid, 4-methyl-3-aminobenzoic acid, 2,4-dimethyl-5-aminobenzoic acid, 4-methoxy-3-aminobenzoic acid, 3-nitro-4-aminobenzoic acid, 3-amino-terephthalic acid methyl ester and 3-amino-terephthalic acid ethyl ester.

The azodicarboxylic acids thus obtained are treated with agents which are capable of converting carboxylic acids into their halides, for example the bromides or chlorides, for example with phosphorus halides, for example phosphorus trichloride, phosphorus pentachloride or phosphorus oxychloride, but especially thionyl chloride. The treatment with such acid-halogenating agents is advantageously carried out in inert organic solvents, for example chlorobenzenes, for example monochlorobenzene or dichlorobenzene, toluene, xylene, benzene or nitrobenzene. When thionyl chloride is used as the acid-chlorinating agent, it is advantageous to carry out the process in the presence of dialkylformamides, especially dimethylformamide.

In the manufacture of the carboxylic acid halides it is generally advisable first to dry the azo compounds which have been manufactured in an aqueous medium or to free them from water by azeotropic distillation in an organic solvent. This azeotropic drying can, if desired, be carried out immediately before the treatment with the acid-halogenating agents.

The dicarboxylic acid halides thus obtained are reacted with amines of the formula (3) especially those of the formula

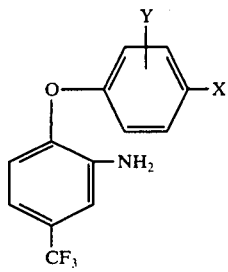

wherein X and Y have the meanings indicated above. As examples, there may be mentioned: 2-p-isopropylphenoxy-5-trifluoromethylaniline, 2-p-tert.butylphenoxy-5-trifluoromethylaniline, 2-p-(α,α-dimethyl-n-butyl)-phenoxy-5-trifluoromethylaniline, 2-p-(α,α,γ,γ-tetramethyl-n-pentyl)-phenoxy-5-trifluoromethylaniline, 2-(2'-methyl-4'-tert.butylphenoxy)-5-trifluoromethylaniline, or 2-(2'-methyl-6'-tert.butylphenoxy)-5-trifluoromethylaniline.

The condensation between the carboxylic acid halides of the type initially mentioned and the amines is advantageously carried out in an anhydrous medium whereby it generally takes place surprisingly easily at temperatures within the boiling range of the common organic solvents, for example toluene, monochlorobenzene, dichlorobenzene, trichlorobenzene and nitrobenzene. To accelerate the reaction it is generally advisable to use an acid-binding agent, for example anhydrous sodium acetate or pyridine. The dyestuffs obtained are in part crystalline and in part amorphous and are in most cases obtained in very good yield and in a pure state. It is advisable to isolate beforehand the acid chlorides obtained from the carboxylic acids. In many cases, however, isolation of the acid chlorides can be dispensed with, without harm, and the condensation can be carried out immediately after the manufacture of the carboxylic acid chlorides.

The new colouring matters are valuable pigments which in a finely divided form can be used for pigmenting high molecular organic material, for example cellulose ethers and cellulose esters, polyamides or polyurethanes or polyesters, acetylcellulose, nitrocellulose, natural or synthetic resins, for example aminoplasts, especially urea-formaldehyde and melamine-formaldehyde resins, alkyd resins, phenoplasts, polycarbonates, polyolefins, for example polyethylene, polypropylene, polystyrene, polyvinyl chloride, polyacrylonitrile, polyacrylic acid esters, rubber, casein, silicone, and silicone resins, singly or as mixtures. In these cases it does not matter whether the high molecular organic compounds mentioned are in the form of plastic masses or melts, or in the form of spinning solutions, lacquers or printing inks. Depending on the end use, it is advantageous to use the new pigments as toners or in the form of preparations. The new pigments are distinguished by good colour strength, dispersibility high fastness properties such as fastness to light, migration and overlacquering, especially outstanding fastness to weathering. When compared with analogous dyestuffs of French patent specification 1 465 252 which have no branched alkyl group in the phenoxy radical, the dyestuffs according to the invention show better fastness to light and especially to weathering. These improved results are highly surprising. Nobody could expect such an improvement in fastness to weathering by introducing a branched alkyl group into the phenoxy group.

In the examples which follow, the parts denote parts by weight and the percentages denote percentages by weight unless otherwise stated.

EXAMPLE 1

70.6 Parts of the dry dyestuff obtained by coupling 2 mols of diazotised 4-chloro-3-aminobenzoic acid and 1 mol of 2,5 bis-acetoacetylamino-4-chloro-1-methoxybenzene are stirred in 1000 parts of o-dichlorobenzene with 5 parts of dimethylformamide and 32.8 parts of thionyl chloride are added during 10 to 15 minutes at 95° to 100° C. The mixture is then heated to 110° to 115° C for 2 hours. When the evolution of hydrochloric acid has subsided, the mixture is allowed to cool to 40° C, and the crystalline dyestuff-carboxylic acid chloride is filtered, washed with 500 parts of o-dichlorobenzene and thereafter with benzene and petroleum ether, and dried in vacuo at 40° to 50° C. About 78 parts of the acid chloride are thus obtained as a yellow crystalline powder.

7.45 Parts of the dry acid chloride in 100 parts of o-dichlorobenzene are stirred with 0.05 part of thionyl chloride and heated to 90° to 95° C. A solution of 7.1 g of 2-p-tert.amylphenoxy-5-trifluoromethylaniline and 0.5 part of pyridine in 50 parts of o-dichlorobenzene is added to this acid chloride suspension. The mixture is then stirred for 12 hours at 140° to 145° C, allowed to cool to 100° C, filtered, and the product is washed with hot o-dichlorobenzene until the filtrate runs completely colourless. Thereafter, the product is washed with cold methanol, and finally with hot water. After drying, a loose soft pigment of the formula

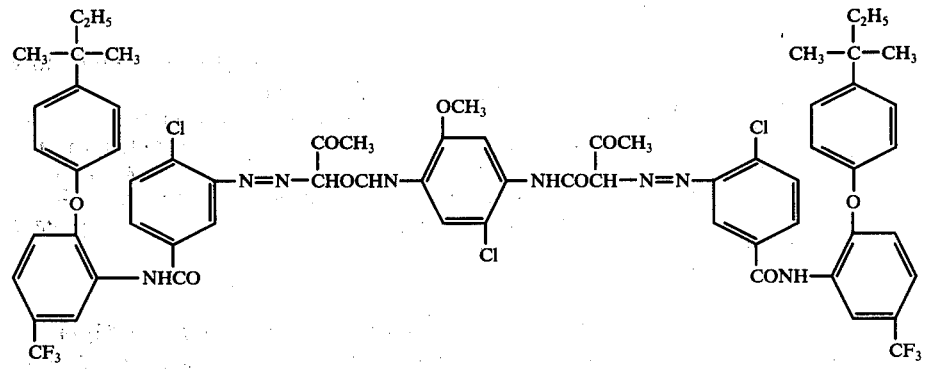

is obtained, which when milled into polyvinyl chloride gives brilliant neutral yellow shades having excellent fastness to migration and outstanding fastness to light and weathering.

Further pigments having equal fastness properties are obtained according to the process of this example when a diazo compound of an aminobenzoic acid of the formula

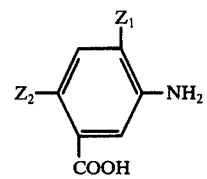

is coupled with a bis-acetoacetyl-arylenediamine of the formula

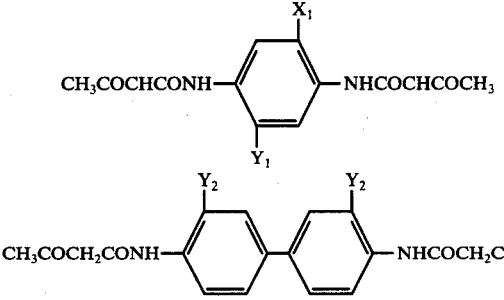

and 1 mol of an acid halide of the resulting disazo dyestuffdicarboxylic acid is condensed with 2 mols of an amine of the formula

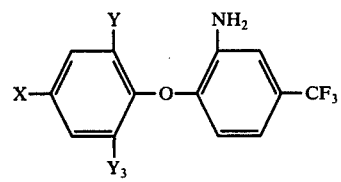

wherein the symbols X, $X_1$, Y, $Y_1$, $Y_2$, $Y_3$, $Z_1$ and $Z_2$ have the meaning indicated in the tables which follows.

Table 1

| | Y | X | $Y_3$ | $Z_1$ | $Z_2$ | $X_1$ | $Y_1$ | Colour shade |
|---|---|---|---|---|---|---|---|---|
| 2 | H | CH$_3$—C(CH$_3$)(CH$_3$)— | H | Cl | H | Cl | CH$_3$ | greenish yellow |
| 3 | H | " | H | Cl | H | Cl | Cl | very greenish yellow |
| 4 | H | " | H | Cl | H | —OCH$_3$ | H | neutral yellow |

Table 1-continued

| | Y | X | $Y_3$ | $Z_1$ | $Z_2$ | $X_1$ | $Y_1$ | Colour shade |
|---|---|---|---|---|---|---|---|---|
| 5 | H | " | H | Cl | H | —CH$_3$ | —CH$_3$ | reddish yellow |
| 6 | H | " | H | Cl | H | —OCH$_3$ | —CH$_3$ | strong reddish yellow |
| 7 | H | " | H | Cl | H | —OCH$_3$ | —OCH$_3$ | orange yellow |
| 8 | H | " | H | Cl | Cl | Cl | CH$_3$ | greenish yellow |
| 9 | H | " | H | CH$_3$ | H | —OCH$_3$ | H | reddish yellow |
| 10 | H | " | H | —OCH$_3$ | H | —OCH$_3$ | Cl | neutral yellow |
| 11 | H | C$_2$H$_5$—C(CH$_3$)(CH$_3$)— | H | Cl | H | —CH$_3$ | Cl | greenish yellow |
| 12 | H | " | H | Cl | H | —CH$_3$ | —CH$_3$ | reddish yellow |
| 13 | H | " | H | Cl | H | —OCH$_3$ | H | reddish yellow |
| 14 | H | " | H | Cl | H | —OCH$_3$ | —OCH$_3$ | yellowish-orange |
| 15 | H | " | H | Cl | Cl | —OCH$_3$ | —Cl | greenish yellow |
| 16 | H | C$_3$H$_7$—C(CH$_3$)(CH$_3$)— | H | Cl | H | —OCH$_3$ | —Cl | greenish yellow |
| 17 | H | C$_2$H$_5$—C(CH$_3$)(CH$_3$)—CH$_2$—C(CH$_3$)(CH$_3$)— | H | Cl | H | —OCH$_3$ | —Cl | greenish yellow |
| 18 | —CH$_3$ | C$_2$H$_5$—C(CH$_3$)(CH$_3$)— | H | Cl | H | —OCH$_3$ | —Cl | greenish yellow |
| 19 | —CH$_3$ | " | —CH$_3$ | Cl | H | —OCH$_3$ | —Cl | greenish yellow |

Table II

| | Y | X | $Y_2$ | $Z_1$ | $Z_2$ | $Y_2$ | Colour shade |
|---|---|---|---|---|---|---|---|
| 20 | H | CH$_3$—C(CH$_3$)(CH$_3$)— | H | Cl | H | —CH$_2$ | reddish yellow |
| 21 | H | " | H | Cl | H | —OCH$_3$ | neutral yellow |
| 22 | H | C$_2$H$_5$—C(CH$_3$)(CH$_3$)— | H | Cl | H | Cl | yellow |
| 23 | H | " | H | Cl | H | —OCH$_3$ | reddish yellow |

EXAMPLE 24

40 parts of an alkyd-melamine stoving enamel having a solide content of 50%, 0.5 part of pigment according to Example 1 and 0.5 part of aluminum bronze were ground in a rod mill for 24 hours. A thin coating of the enamel so prepared was applied to a metal sheet and stoved for 1 hour at 130° C. The so obtained yellow coating has an excellent fastness to weathering.

EXAMPLE 25

10 g of titanium dioxide and 2 g of the pigment prepared according to Example 2 are ground for 48 hours with 88 g of a mixture of 26.4 g of coconut alkyd resin, 24.0 g of melamine formaldehyde resin (50% solids content), 8.8 g of ethylene glycol monomethyl ether and 28.8 g of xylene in a ball mill.

If this lacquer is sprayed onto an aluminium foil, pre-dried for 30 minutes at room temperature and stoved for 30 minutes at 120° C, a yellow lacquering is obtained, which is very deep in colour and is distinguished by very good fastness to overlacquering, light and weathering.

EXAMPLE 26

8 parts of a preparation consisting of 50% of the pigment according to Example 1 and 50% cellulose acetobutyrate EAB 551-0.2 of Eastman are stirred into 20 parts of solvent of the following composition: 50 parts of Solvesso 150, 15 parts of butyl acetate, 5 parts of Exkin II (levelling agent), 25 parts of methyl isobutyl ketone and 5 parts of silicone oil (1% in Solvesso 150). After complete fine distribution has been achieved (in about 15 - 60 minutes depending on the nature of the stirrer) the binders are added, namely 48.3 parts of Baycryl L 530 (51% in xylene/butanol, 3:1) and 23.7 parts of Maprenal TTX (55% in butanol). After brief homogenisation the lacquer is applied according to usual methods for example spraying and dipping or especially, for the continuous coating of sheet metal, by the "coil coating" process, and is stoved (stoving 30 minutes, 130° C). The resulting yellow lacquerings are distinguished by very good levelling, high gloss and excellent fine distribution of the pigment as well as by excellent resistance to weathering.

The preparations obtained according to examples 2 – 10 can be employed instead of the preparation obtained according to example 1 with equally good results.

I claim:

1. A disazo pigment of the formula

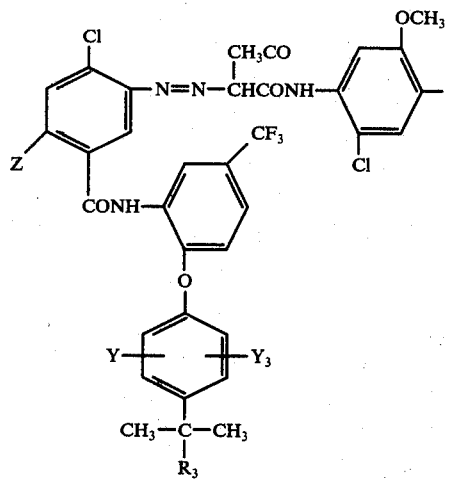

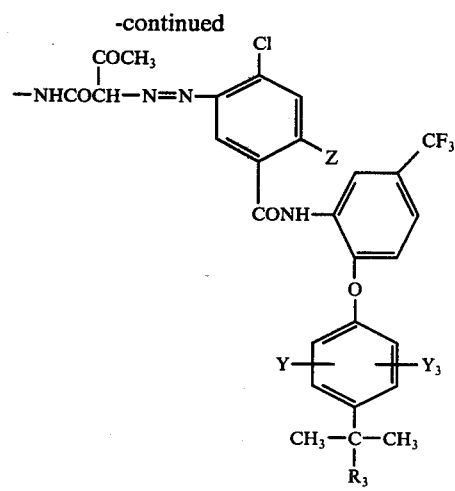

wherein $R_3$ is alkyl containing 2 to 6 carbon atoms, Y is hydrogen, chloro, or lower alkyl, $Y_3$ is hydrogen, or lower alkyl, and Z is hydrogen or chloro.

2. The pigment as claimed in claim 1 of the formula

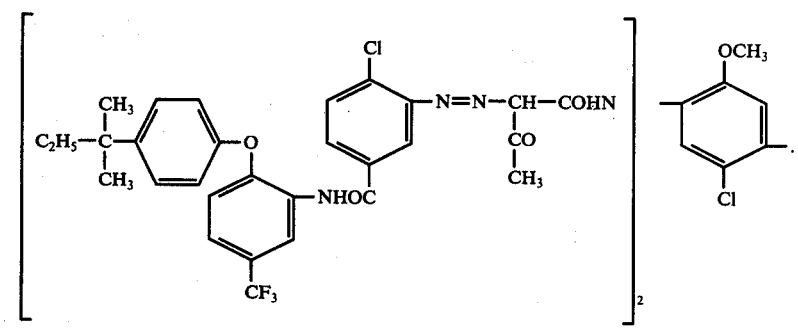

3. The pigment as claimed in claim 1 of the formula

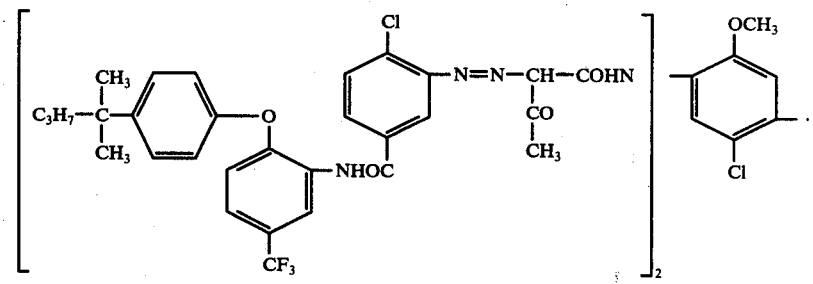

4. The pigment as claimed in claim 1 of the formula

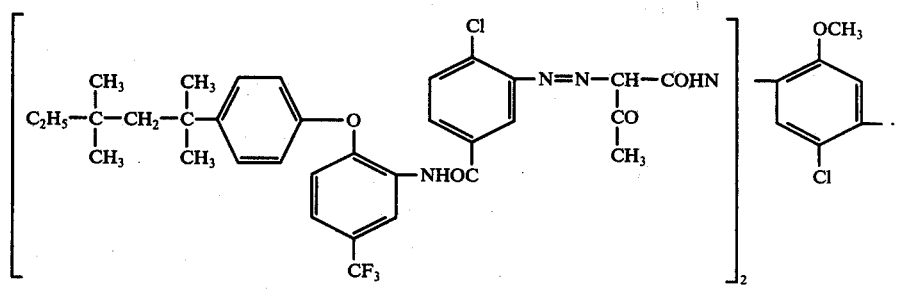

* * * * *